June 27, 1939. G. L. KAMPA 2,163,605
SPEED RESPONSIVE SWITCH
Filed Dec. 23, 1937
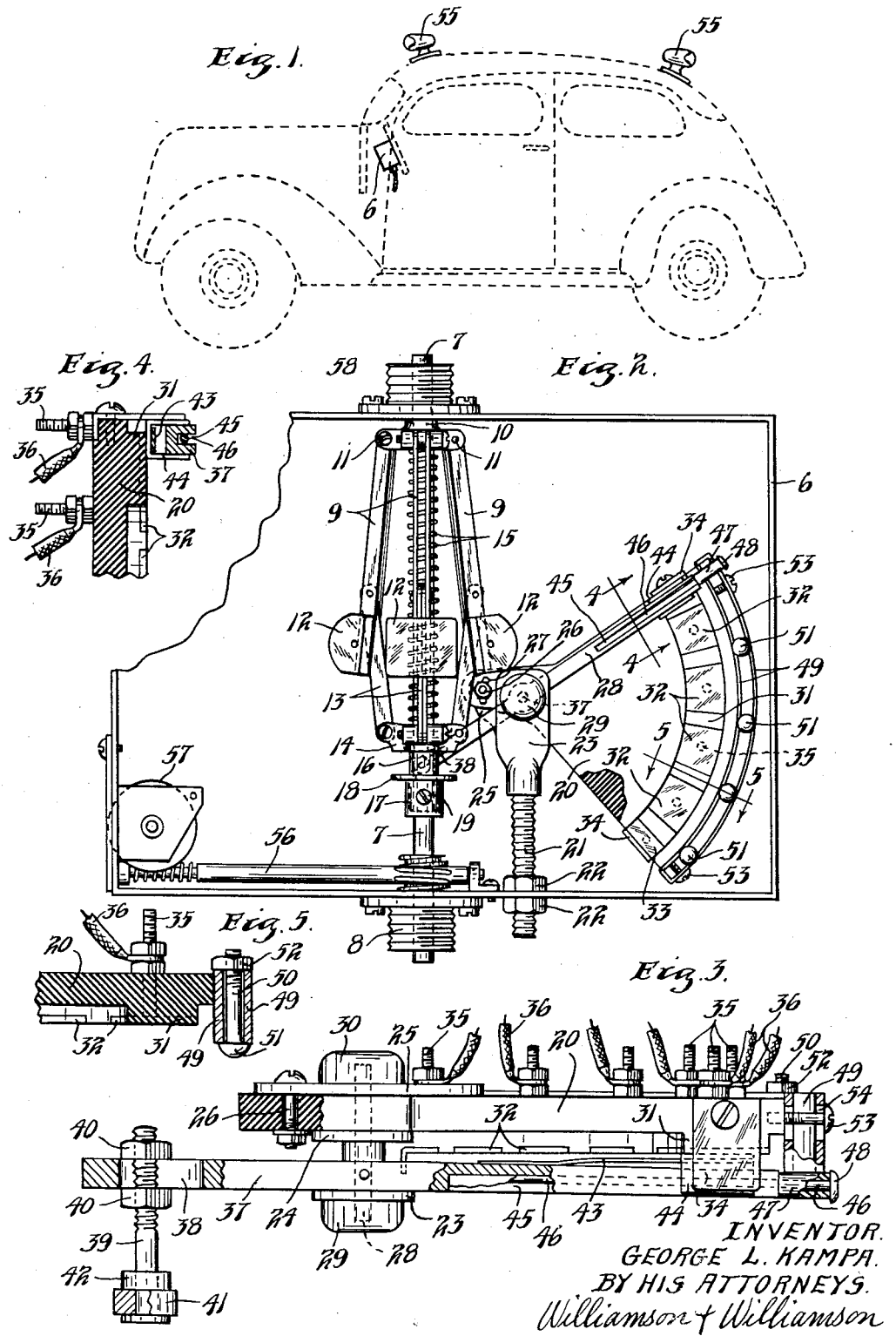
INVENTOR.
GEORGE L. KAMPA.
BY HIS ATTORNEYS.
Williamson & Williamson Patented June 27, 1939

2,163,605

UNITED STATES PATENT OFFICE 2,163,605

SPEED RESPONSIVE SWITCH

George L. Kampa, Minneapolis, Minn.

Application December 23, 1937, Serial No. 181,376

4 Claims. (Cl. 200—80)

This invention relates to speed indicating devices for motor vehicles.

One of the objects of the invention is to provide means for indicating the speed of motor vehicles by the opening and closing of electrical circuits which are adapted to energize lights or other forms of signalling devices.

Another object of the invention is to provide a speed indicating device which is adapted to signal various predetermined speeds and which has improved means for releasing one speed signal and actuating another speed signal.

A further object of the invention is to provide a speed indicating device which is capable of exact adjustment to meet the conditions of operation of various types of vehicles and one which can be quickly and easily corrected to compensate for wear.

These and other objects and advantages of the invention will more fully appear from the following description made in connection with the accompanying drawing wherein like reference characters refer to the same or similar parts throughout the views, and, in which:

Fig. 1 is a side elevation of a motor vehicle in dotted lines with certain elements of my invention shown thereon in full lines;

Fig. 2 is a side elevation of my signal control apparatus;

Fig. 3 is a top plan view partially broken away of the circuit making and breaking unit;

Fig. 4 is a section taken approximately on the line 4—4 of Fig. 2; and

Fig. 5 is a section taken approximately on the line 5—5 of Fig. 2.

In the drawing I have shown a frame work or casing 6 which is adapted to support in suitable bearings a shaft 7, the lower end of said shaft being formed to connect with a flexible cable such as is commonly used to connect with a conventional vehicle speedometer. Usually there is an inner flexible shaft with a key connection for connection with the shaft 7, and an outer flexible tube adapted to threadedly fit upon the threaded connection 8 secured to the box 6. The shaft 7 has secured thereupon for rotation therewith a speed responsive device comprising a plurality of levers 9 pivotally connected at their upper ends to a hub element 10 by means of small screws 11. The lower ends of the levers 9 are provided with weights 12. A plurality of relatively short levers 13 connect with the lower portions of the levers 9 and also with a slidably mounted hub element 14 near the lower end of the shaft 7. A spring 15 is mounted upon the shaft between the hubs 10 and 14 to normally urge the hubs apart and consequently bring the levers 9 inwardly toward the shaft 7. When the shaft 7 is rotated the weights 12 will tend to fly outwardly due to centrifugal force. The levers 9 and 13 then swing outwardly and the hub 14 is drawn upwardly against the action of the spring 15. The hub 14 has a downwardly extending sleeve 16 upon which is adjustably secured a second sleeve 17 having a collar 18 and held in position by a set screw 19. Thus a groove or channel is formed between the collar 18 and the lower face of the hub 14.

Positioned adjacent the speed responsive device just described is a segmental block of electrical insulation 20. The block of insulation is supported by a threaded element 21 which extends through the bottom of the box or casing 6, and is held by lock nuts 22. The upper portion of the threaded post 21 is provided with a pair of forked arms 23 and 24, and spaced from the fork 24 is a plate-like element 25, which is also supported by the threaded post 21. The block of insulation 20 fits in between the forked arm 24 and the plate 25 with a securing bolt 26 extending through the plate 25 and block 20, the latter having an arcuate slot 27 to receive said bolt. In addition a pivot pin 28 extends through the forks 23 and 24, the insulating block 20 and the plate 25, said pivot pin being held between a pair of bearing caps 29 and 30, which are threaded to the forked arm 23 and the plate 25 respectively.

The insulating block has a raised portion 31, as shown in Figs. 3, 4, and 5, and this raised portion has countersunk therein a plurality of electrical contacts 32. At either end of the arcuate set of contacts 32 is contact 33 having an outwardly turned edge 34 providing a stop. Each of the contacts 32 and 33 is connected by means of suitable binding posts 35 to wires 36 which form part of the electrical system of the motor vehicle.

A pivoted contact arm 37 is mounted intermediate its ends upon the pivot pin 28, and the inner end of said contact arm is provided, as shown in Fig. 3, with a slot 38 adapted to receive a bolt 39, which upon loosening of its lock nuts 40 can be moved back and forth in said slot. The free end of the bolt 39 is provided with a roller 41 mounted in a suitable bearing 42. The roller is adapted to fit within the channel or groove formed by the collar 18 on the sleeve 17 and the lower surface of the lower hub 14 of the speed responsive device. On the inner face of the pivoted arm 37 between said arm and the insulating block 20 is a flat spring element 43 which extends outwardly to the end of the pivoted arm 37, and has secured thereon a substantially U-shaped electrical brush element 44, which due to the action of the spring 43 is urged toward the contact elements 32 on the insulating block 20.

The pivoted arm 37 has a cut-out 45 disposed oppositely from the spring element 43 and extending outwardly to the end of said pivoted arm. Positioned within the cut-out is a spring tongue 46 secured to the pivoted arm at its inner end and free of said arm at its outer end. The outer end of the spring 46 is provided with a roller 47 and may be secured to said spring element with a rivet-like retaining device 48.

Mounted along the curved edge of the insulating block 20 is a support comprising a pair of spaced arcuate strips of metal 49 between which are inserted small bolts 50, as shown in Fig. 5, said bolts having rounded heads 51 and being securely held between the metal strips 49 by means of nuts 52. The strips 49 are secured to the block of insulation 20 by means of screws 53 which extend through slots 54 in said strips to permit adjustable mounting of the strips. It will now be noted that the roller 47 on the spring leaf 46 will roll upon the edges of the metal strips 49 when the pivoted arm 37 is moved.

From the foregoing description it will be seen that when the speed responsive device is rotated by means of a flexible connection with the transmission or other suitable moving part of the vehicle, the weights 12 on the pivoted levers 9 will move outwardly due to centrifugal force, and the hub 14 and collar 18 will be drawn upwardly. This will cause the pivoted contact arm 37, which is connected in the electrical system of the vehicle, to move with the speed responsive device, the outer end of the arm 37 moving downwardly into engagement with successive electrical contacts 32, which are also connected in the electrical system of the vehicle. This will cause lighting of the respective lights to which the contacts 33 are connected, and these lights may be arranged in suitable casings 55 at the front and rear of the vehicle on the exterior thereof, and in the same manner interior lights on the instrument panel may be illuminated. This gives the driver, as well as persons traveling in other vehicles, an accurate idea as to the speed of the vehicle upon which my invention is installed.

It has been found that if a simple pivot contact arm and a row of stationary contact elements are used there must necessarily be a gap between the stationary contacts, and while the contact arm is passing over this gap there is no signal displayed. Thus if the vehicle were traveling at such a speed that the contact arm was maintained between two of the stationary contacts, then there would be absolutely no signal to give an idea of the speed of the vehicle. In order to overcome this I have placed the bolts 50 with their rounded heads 51 adjacent the dead spots between the stationary contacts 32 so that the roller element 47 on the end of the contact arm 37 will engage the rounded bolt heads 51, and be temporarily halted. With a little increase in speed, however, the obstruction offered by the bolt heads 51 will be overcome and the contact arm 37 will jump sharply over to the next stationary contact 32. To provide a greater or lesser amount of play in the contact arm 37 to permit this jumping movement between stationary contacts, I have provided the adjustable sleeve 17 and the collar 18, which is mounted thereon, to widen or lessen the distance between the collar 18 and the lower face of the lower hub 14 on the shaft 7 in the speed responsive unit.

The end contacts 33 with their upstanding edges 34 may be connected to lights on the instrument panel of the vehicle and the lights on the outside thereof to indicate the minimum and maximum speeds of the vehicle. In other words, if the vehicle is at rest and parked along side the highway, there will be a light to indicate the presence thereof, and if the vehicle is traveling at its maximum a flashing red light or other signal may be utilized to warn other drivers on the highway.

The device is capable of several adjustments to compensate for wear or other conditions peculiar to a particular vehicle. It has been described above that the arcuate strips 49 holding the round headed bolts 50 may be adjusted relative to the pivotal contact arm 37 and it has also been shown how the collar engaging roller 41 can be adjusted in the slot 38 in the inner end of said contact arm. If the roller 41 is moved, it may be also necessary to move the threaded post 21, which supports the insulating block 20 and the stationary contacts. In that case, of course, the casing 6 may be provided with a slot to receive said threaded post 21.

In Fig. 2 there is shown a horizontal drive shaft 56 which is geared at one end to the vertical shaft 7 of the speed responsive device, and at the other end to a trip mileage indicator 57. The mileage indicator is of conventional structure and need not be described here. It is preferred that it be positioned, of course, in a manner which will permit its inspection by the driver. The upper end of the shaft 7, which is rotated by its connection with the vehicle transmission, is provided with a connection 58 similar to the one at the lower end of the shaft, so that a conventional needle type or other mechanical type of speedometer may be connected thereto if desired. This is of particular advantage in case of any trouble with the lighting system of the vehicle since its operation would be entirely mechanical and independent of the above described electrical speed indicating mechanism.

It will be seen from the foregoing that I have provided a speed indicating device which is of relatively simple construction but at the same time is extremely efficient in operation, and which can be quickly applied to any type of passenger vehicle, public transit vehicle, or truck without any extensive alteration thereto. It is a device which will provide a signal, visible to the drivers of other vehicles, which is at all times in operation and which has provision for eliminating failure of the signal to function due to possible positioning of the movable contact arm at the insulating areas between the stationary contacts.

It will, of course, be understood that various changes may be made in the form, details, arrangement and proportions of the various parts without departing from the scope of my invention.

What is claimed is:

1. In a speed indicating device for vehicles and the like, a speed responsive device adapted to be connected to a moving part of the vehicle, a series of spaced stationary contact elements, a movable contact element connected to said speed responsive device and adapted to engage said stationary contact elements, and means positioned adjacent said stationary contacts for retarding and then suddenly releasing said movable contact element.

2. In a speed indicating device for vehicles and the like, a speed responsive device adapted to be connected to a moving part of the vehicle, a series of stationary contact elements adjacent said speed responsive device, a movable contact element connected to said speed responsive device and adapted to successively engage said stationary contact elements, a plurality of movable contact retarding elements in the path of travel of said movable element, and means yieldably mounted on said movable contact element for engaging said retarding elements.

3. The structure in claim 2 and said retarding elements being adjustably positioned relative to said stationary contact elements.

4. In a speed indicator device for vehicles and the like, a speed responsive device adapted to be connected to a moving part of the vehicle, a plurality of spaced stationary electrical contacts, a movable electrical contact device operatively controlled by said speed responsive device and movable to successively engage said stationary contacts, yielding means for holding said movable contact device on one of said stationary contacts against the tendency of said movable contact to move therefrom upon changes in speed of the vehicle, and said movable contact device being releasable after a vehicle speed change sufficient to cause said movable contact to immediately jump the space between adjacent contacts whereby the next adjacent contact is immediately contacted and said movable contact cannot rest in or have delayed movement across the space between adjacent stationary contacts.

GEORGE L. KAMPA.